(12) United States Patent
Woodhead et al.

(10) Patent No.: US 10,203,004 B2
(45) Date of Patent: Feb. 12, 2019

(54) METHOD OF USING A TOLERANCE RING

(71) Applicant: Saint-Gobain Performance Plastics Rencol Limited, Coventry (GB)

(72) Inventors: Niki S. Woodhead, Bristol (GB); Andrew Robert Slayne, Bristol (GB)

(73) Assignee: SAINT-GOBAIN PERFORMANCE PLASTICS RENCOL LIMITED, Coventry (GB)

(*) Notice: Subject to any disclaimer, the term of this patent is extended or adjusted under 35 U.S.C. 154(b) by 245 days.

(21) Appl. No.: 14/636,550

(22) Filed: Mar. 3, 2015

(65) Prior Publication Data

US 2015/0167746 A1     Jun. 18, 2015

Related U.S. Application Data

(63) Continuation of application No. 10/552,875, filed as application No. PCT/GB2004/001681 on Apr. 16, 2004, now Pat. No. 9,206,853.

(30) Foreign Application Priority Data

Apr. 17, 2003  (GB) .................... 0308957.0

(51) Int. Cl.
    *F16D 1/08*     (2006.01)
    *F16C 27/00*    (2006.01)
    (Continued)

(52) U.S. Cl.
    CPC ............ *F16D 1/0835* (2013.01); *F16C 27/00* (2013.01); *F16C 35/02* (2013.01); *F16C 35/07* (2013.01);
    (Continued)

(58) Field of Classification Search
    CPC ........ F16D 1/0835; F16C 35/07; F16C 43/00; F16C 35/02; F16C 35/077; F16C 27/00;
    (Continued)

(56) References Cited

U.S. PATENT DOCUMENTS 1,469,880 A   10/1923  Bowden
2,386,951 A   10/1945  Howe
(Continued)

FOREIGN PATENT DOCUMENTS

BR   PI9201846 A    1/1993
CA      2526653    12/2004
(Continued)

OTHER PUBLICATIONS

International Search Report for PCT/GB2004/001681 dated Sep. 13, 2004, 3 pages.
(Continued)

*Primary Examiner* — Sarang Afzali
(74) *Attorney, Agent, or Firm* — Abel Law Group, LLP; Chi Suk Kim (57) ABSTRACT

A tolerance ring has a band with outwardly extending corrugated protrusions forming waves that engage an outer surface of a shaft. At one end of the tolerance ring is an inwardly flared guide surface extending axially and radially from the band. The guide surface acts as a tapered entrance to a bore of a housing to assist during assembly.

8 Claims, 3 Drawing Sheets

(51) Int. Cl.

| | |
|---|---|
| *F16C 35/02* | (2006.01) |
| *F16C 35/073* | (2006.01) |
| *F16C 35/077* | (2006.01) |
| *G11B 25/04* | (2006.01) |
| *F16C 43/00* | (2006.01) |
| *F16C 35/07* | (2006.01) |
| *F16D 1/06* | (2006.01) |
| *G11B 5/48* | (2006.01) |
| *G11B 33/12* | (2006.01) |

(52) U.S. Cl.
CPC .......... *F16C 35/073* (2013.01); *F16C 35/077* (2013.01); *F16C 43/00* (2013.01); *G11B 5/4813* (2013.01); *G11B 25/043* (2013.01); *G11B 33/123* (2013.01); *F16C 2370/12* (2013.01); *F16D 2001/062* (2013.01); *G11B 5/4806* (2013.01); *G11B 33/12* (2013.01); *Y10T 29/49696* (2015.01); *Y10T 29/49945* (2015.01); *Y10T 403/452* (2015.01); *Y10T 403/453* (2015.01); *Y10T 403/7047* (2015.01); *Y10T 403/7049* (2015.01); *Y10T 403/7058* (2015.01); *Y10T 403/7061* (2015.01)

(58) Field of Classification Search
CPC ... F16C 35/073; G11B 25/043; G11B 33/123; G11B 5/4813; B23P 19/02; B23P 11/02; B29C 65/565; Y10T 29/49696; Y10T 29/49945; Y10T 29/53987; Y10T 29/53952; Y10T 403/7049; Y10T 403/453; Y10T 403/452; Y10T 403/7047; Y10T 403/7061; Y10T 403/7058; B21D 39/04; B21D 39/046; B21D 39/048; F16L 13/14; F16B 4/004; F16F 1/3732; F16F 2230/0082
USPC ........ 384/535, 537, 581, 295, 301; 267/161, 267/293
See application file for complete search history.

(56) References Cited

U.S. PATENT DOCUMENTS

| | | | |
|---|---|---|---|
| 2,865,692 A | 12/1958 | Gossmann | |
| 2,886,354 A | 5/1959 | Gustaf | |
| 2,931,412 A | 4/1960 | Wing | |
| 3,061,386 A | 10/1962 | Dix et al. | |
| 3,094,376 A | 6/1963 | Thomas | |
| 3,142,887 A | 8/1964 | Hillck et al. | |
| 3,151,330 A * | 10/1964 | Scuccimarri | B21K 1/56 227/140 |
| 3,438,660 A | 4/1969 | Steiner | |
| 3,494,676 A | 2/1970 | Compton | |
| 3,586,402 A * | 6/1971 | Howe, Jr. | F16C 27/066 384/536 |
| 3,633,398 A | 1/1972 | Koch | |
| 3,700,271 A | 10/1972 | Blaurock et al. | |
| 3,747,997 A | 7/1973 | Winn | |
| 3,838,928 A | 10/1974 | Blaurock et al. | |
| 3,976,340 A | 8/1976 | Pitner | |
| 4,072,368 A | 2/1978 | Ehrentraut | |
| 4,079,168 A | 3/1978 | Schwemmer et al. | |
| 4,083,622 A | 4/1978 | Neidecker | |
| 4,269,550 A * | 5/1981 | DiGiulio | B23B 49/023 29/432 |
| 4,286,894 A | 9/1981 | Rongley | |
| 4,376,254 A | 3/1983 | Hellmann | |
| 4,790,683 A | 12/1988 | Cramer et al. | |
| 4,800,623 A | 1/1989 | Brockhaus | |
| 4,828,423 A | 5/1989 | Cramer, Jr. et al. | |
| 4,889,772 A | 12/1989 | Bergmann et al. | |
| 4,916,026 A | 4/1990 | Bergmann et al. | |
| 4,932,795 A | 6/1990 | Guinn | |
| 4,981,390 A | 1/1991 | Cramer, Jr. et al. | |
| 5,003,212 A | 3/1991 | Ibe et al. | |
| 5,030,260 A | 7/1991 | Beck et al. | |
| 5,056,937 A | 10/1991 | Tanaka et al. | |
| 5,193,917 A | 3/1993 | Adler et al. | |
| 5,305,654 A | 4/1994 | Durham | |
| 5,315,465 A | 5/1994 | Blanks | |
| 5,328,160 A | 7/1994 | McLaughlin | |
| 5,413,374 A * | 5/1995 | Pierce | B60G 7/00 267/141.2 |
| 5,609,421 A | 3/1997 | Schulze-Eyssing et al. | |
| 5,633,086 A | 5/1997 | Hsu et al. | |
| 5,803,614 A | 9/1998 | Tsuji et al. | |
| 5,885,006 A | 3/1999 | Sheedy | |
| 5,906,029 A | 5/1999 | Fox | |
| 5,939,215 A | 8/1999 | Andler | |
| 5,964,474 A | 10/1999 | Chen | |
| 5,988,885 A | 11/1999 | Heshmat | |
| 5,999,373 A | 12/1999 | Allsup et al. | |
| 6,018,441 A | 1/2000 | Wu et al. | |
| 6,086,257 A | 7/2000 | Lee | |
| 6,114,040 A | 9/2000 | Gebregiorgis et al. | |
| 6,163,441 A | 12/2000 | Wood et al. | |
| 6,178,639 B1 | 1/2001 | Lytwynec et al. | |
| 6,186,027 B1 | 2/2001 | Nielsen | |
| 6,228,471 B1 | 5/2001 | Neerinck et al. | |
| 6,261,061 B1 | 7/2001 | Pfaffenberger | |
| 6,288,878 B1 | 9/2001 | Misso et al. | |
| 6,294,597 B1 | 9/2001 | Rinde et al. | |
| 6,321,712 B1 | 11/2001 | Havel | |
| 6,333,839 B1 | 12/2001 | Misso et al. | |
| 6,411,472 B1 | 6/2002 | Allsup | |
| 6,428,744 B1 | 8/2002 | Takayama et al. | |
| 6,480,363 B1 | 11/2002 | Prater | |
| 6,516,940 B1 | 2/2003 | Hart et al. | |
| 6,527,449 B1 | 3/2003 | Koyama et al. | |
| 6,572,270 B2 | 6/2003 | Takemura et al. | |
| 6,603,634 B1 | 8/2003 | Wood et al. | |
| 6,606,224 B2 | 8/2003 | Macpherson et al. | |
| 6,655,847 B2 | 12/2003 | Obara et al. | |
| 6,740,428 B2 | 5/2004 | Norito et al. | |
| 6,744,604 B2 | 6/2004 | Misso | |
| 6,754,046 B2 | 6/2004 | Barina et al. | |
| 6,755,746 B2 | 6/2004 | Barnley et al. | |
| 6,813,120 B1 | 11/2004 | Misso | |
| 6,889,956 B2 | 5/2005 | Gutierrez et al. | |
| 6,905,779 B2 | 6/2005 | Sakai et al. | |
| 6,935,005 B2 * | 8/2005 | Avery | B25B 27/0035 29/273 |
| 7,007,386 B1 | 3/2006 | Stover | |
| 7,054,111 B2 | 5/2006 | Dominquez et al. | |
| 7,085,108 B1 | 8/2006 | Oveyssi et al. | |
| 7,118,181 B2 | 10/2006 | Frear | |
| 7,118,808 B2 | 10/2006 | Wölki et al. | |
| 7,149,281 B2 | 12/2006 | Lacherade et al. | |
| 7,367,107 B1 | 5/2008 | Fruge et al. | |
| 7,554,771 B2 | 6/2009 | Hanrahan et al. | |
| 7,580,225 B2 | 8/2009 | Hanrahan et al. | |
| 7,583,476 B2 | 9/2009 | Hanrahan et al. | |
| 7,742,676 B2 | 6/2010 | Tilliette et al. | |
| 7,850,389 B2 | 12/2010 | Hanrahan et al. | |
| 7,922,418 B2 | 4/2011 | Baker et al. | |
| 7,957,103 B2 | 6/2011 | Woodhead et al. | |
| 7,958,637 B2 | 6/2011 | Hughes | |
| 7,978,437 B2 | 7/2011 | Hanrahan et al. | |
| 8,021,072 B2 | 9/2011 | Court et al. | |
| 8,228,640 B2 | 7/2012 | Woodhead et al. | |
| 8,233,242 B2 | 7/2012 | Court et al. | |
| 8,317,425 B2 | 11/2012 | Court et al. | |
| 8,363,359 B2 | 1/2013 | Slayne et al. | |
| 8,482,882 B2 | 7/2013 | Slayne et al. | |
| 8,485,752 B2 | 7/2013 | Slayne | |
| 2002/0024770 A1 | 2/2002 | Hong et al. | |
| 2002/0039461 A1 | 4/2002 | Obara et al. | |
| 2002/0097927 A1 | 7/2002 | Lee et al. | |
| 2002/0097937 A1 | 7/2002 | Obara | |
| 2002/0118490 A1 | 8/2002 | Macpherson et al. | |
| 2002/0123608 A1 | 9/2002 | Howard, III | |
| 2002/0172836 A1 | 11/2002 | Takayama et al. | |

(56) References Cited

U.S. PATENT DOCUMENTS

| | | |
|---|---|---|
| 2003/0053260 A1 | 3/2003 | Barina et al. |
| 2003/0150140 A1 | 8/2003 | Takayama et al. |
| 2004/0057643 A1 | 3/2004 | Blanchard et al. |
| 2004/0076356 A1 | 4/2004 | Kapaan et al. |
| 2004/0157750 A1 | 8/2004 | Danly, Sr. et al. |
| 2004/0246627 A1 | 12/2004 | Durrum et al. |
| 2005/0018936 A1 | 1/2005 | Yoshimura et al. |
| 2005/0051975 A1 | 3/2005 | Takayama et al. |
| 2005/0077101 A1 | 4/2005 | Yamamoto et al. |
| 2005/0181216 A1 | 8/2005 | Nakanishi et al. |
| 2005/0185865 A1 | 8/2005 | Agrawal |
| 2005/0225903 A1 | 10/2005 | Sprankle et al. |
| 2006/0165973 A1 | 7/2006 | Dumm et al. |
| 2006/0177685 A1 | 8/2006 | Matsuda et al. |
| 2006/0181811 A1 | 8/2006 | Hanrahan et al. |
| 2006/0214341 A1 | 9/2006 | Sugiura et al. |
| 2006/0228174 A1 | 10/2006 | Woodhead et al. |
| 2006/0275076 A1 | 12/2006 | Hanrahan et al. |
| 2006/0276246 A1 | 12/2006 | Needes et al. |
| 2007/0000680 A1 | 1/2007 | Adachi et al. |
| 2007/0096572 A1 | 5/2007 | Watkins et al. |
| 2007/0291417 A1 | 12/2007 | Woodhead et al. |
| 2008/0028591 A1 | 2/2008 | Hughes |
| 2008/0043374 A1 | 2/2008 | Hanrahan et al. |
| 2008/0043375 A1 | 2/2008 | Hanrahan et al. |
| 2008/0160300 A1 | 7/2008 | Hwang et al. |
| 2008/0199254 A1 | 8/2008 | Baker et al. |
| 2008/0218008 A1 | 9/2008 | Ghasripoor et al. |
| 2008/0266717 A1 | 10/2008 | Court et al. |
| 2008/0267693 A1 | 10/2008 | Court et al. |
| 2009/0238504 A1 | 9/2009 | Suzuki et al. |
| 2010/0126823 A1 | 5/2010 | Gautier et al. |
| 2010/0321833 A1 | 12/2010 | Woodhead et al. |
| 2011/0049834 A1 | 3/2011 | Natu |
| 2011/0076096 A1 | 3/2011 | Slayne et al. |
| 2011/0271512 A1 | 11/2011 | Hughes |
| 2012/0240350 A1 | 9/2012 | Natu et al. |

FOREIGN PATENT DOCUMENTS

| | | |
|---|---|---|
| CN | 1126286 A | 7/1996 |
| CN | 1402871 A | 3/2003 |
| CN | 1459007 A | 11/2003 |
| CN | 1478270 A | 2/2004 |
| CN | 101122304 A | 2/2008 |
| DE | 1872950 U | 5/1963 |
| DE | 50166 A1 | 10/1966 |
| DE | 2934271 A | 3/1981 |
| DE | 3248148 A | 7/1984 |
| DE | 3338507 A1 | 11/1984 |
| DE | 4114643 A1 | 12/1995 |
| DE | 19915417 A1 | 10/1999 |
| DE | 10027513 A1 | 12/2001 |
| EP | 507544 A1 | 10/1992 |
| EP | 514329 A2 | 11/1992 |
| EP | 554144 A1 | 4/1993 |
| EP | 514329 B1 | 9/1995 |
| EP | 1302684 A1 | 4/2003 |
| EP | 1498911 A1 | 1/2005 |
| EP | 1305530 B1 | 3/2005 |
| EP | 1568437 A1 | 8/2005 |
| EP | 1731783 A2 | 12/2006 |
| EP | 1886895 A1 | 2/2008 |
| EP | 1985875 A | 10/2008 |
| EP | 2009145 A1 | 12/2008 |
| GB | 195795 A | 4/1923 |
| GB | 414631 | 5/1933 |
| GB | 687691 A | 2/1953 |
| GB | 703563 | 2/1954 |
| GB | 866678 | 4/1961 |
| GB | 972589 A | 10/1964 |
| GB | 1376563 | 12/1974 |
| GB | 2069070 A | 8/1981 |
| GB | 2342425 A | 4/2000 |
| GB | 2382386 | 5/2003 |
| GB | 2459959 A | 11/2009 |
| JP | S48-021050 A | 3/1973 |
| JP | 1981-049415 A | 5/1981 |
| JP | 59166711 A | 9/1984 |
| JP | 63076908 A | 4/1988 |
| JP | 3048013 A | 3/1991 |
| JP | 04-285317 A | 10/1992 |
| JP | 5052222 A | 3/1993 |
| JP | 5052223 A | 3/1993 |
| JP | H05-098463 A | 4/1993 |
| JP | H0598463 A | 4/1993 |
| JP | 5126147 A | 5/1993 |
| JP | H05179277 A | 7/1993 |
| JP | 5-205413 A | 8/1993 |
| JP | H0790533 A | 4/1995 |
| JP | 09-060397 A | 3/1997 |
| JP | 09508692 | 9/1997 |
| JP | 2000-120663 A | 4/2000 |
| JP | 2000188856 A | 7/2000 |
| JP | 2001208082 A | 8/2001 |
| JP | 2002213453 | 7/2002 |
| JP | 2003183684 A | 7/2003 |
| JP | 2003-247542 A | 9/2003 |
| JP | 2004-513309 A | 4/2004 |
| JP | 2004277565 A | 10/2004 |
| JP | 2004360855 A | 12/2004 |
| JP | 2006-105380 A | 4/2006 |
| JP | 2007502370 | 2/2007 |
| JP | 2007186149 A | 7/2007 |
| JP | 2007239838 | 9/2007 |
| JP | 2008069923 A | 3/2008 |
| JP | 2008069924 A | 3/2008 |
| JP | 2008069925 A | 3/2008 |
| JP | 2008095178 A | 4/2008 |
| JP | 2008156690 A | 7/2008 |
| JP | 2008-531430 A | 8/2008 |
| JP | 2008184621 A | 8/2008 |
| JP | 2008281017 A | 11/2008 |
| JP | 2009-299748 A | 12/2009 |
| JP | 2012-183577 A | 9/2012 |
| SU | 1646706 A2 | 5/1991 |
| WO | 94/29609 A1 | 12/1994 |
| WO | 0141136 A1 | 6/2001 |
| WO | 0159314 A1 | 8/2001 |
| WO | 02/37479 A1 | 5/2002 |
| WO | 03025907 | 3/2003 |
| WO | 2004094852 | 11/2004 |
| WO | 2004104268 | 12/2004 |
| WO | 2006056731 | 6/2006 |
| WO | 2008021890 A2 | 2/2008 |
| WO | 2011023794 | 3/2011 |
| WO | 2011036126 | 3/2011 |

OTHER PUBLICATIONS

European Search Report for European Patent Application No. 07252993-6 dated Dec. 19, 2007, 7 pages.
European Search Report for European Patent Application No. 09013623.5 dated Jan. 14, 2010, 5 pages.
Plastic Deformation; Author Unknown/ Matter Project, University of Liverpool; 1 page (1999).
Beer et al.; Mechanics of Materials; section 2.6, Elastic Versus Plastic Behavior of Material; McGraw-Hill Book Co.; pp. 39-41 (1981).
A.R. Slayne,; "Performance Characteristics of Actuator/Bearing Joints Made With Tolerance Rings", Magnetic Recording Conference, 2002. Digest of Asia-Pacific; ISBN: 0-7803-7509-2; pp. WE-P-14-01 to WE-P-14-02; Dec. 10, 2002.
International Search Report for PCT/EP2010/062544 dated Dec. 28, 2010, 12 pages.
International Search Report for PCT/EP2010/063828 dated Dec. 21, 2010, 3 pages.
International Search Report for PCT/GB2005/004067 dated Sep. 13, 20040, 2 pages.
U.S. Appl. No. 13/427,459, filed Mar. 22, 2012, Inventors: Parag Natu et al.

(56) References Cited

OTHER PUBLICATIONS

U.S. Appl. No. 11/718,172, filed May 31, 2007 Inventors: Niki S. Woodhead et al.
U.S. Appl. No. 12/884,383, filed Sep. 17, 2010 Inventors: Andrew Robert Slayne et al.
U.S. Appl. No. 12/549,713, filed Aug. 28, 2009 Inventors: Paruag Natu.
U.S. Appl. No. 12/033,241, filed Feb. 19, 2008 Inventors: Marcus Baker et al.
International Search Report from PCT Application No. PCT/IB2009/006835 dated Dec. 16, 2009, 2 pgs.
"Tolerance rings" Engineering Magazine—Technical File, 92, Aug. 1981.
Giri L. Agrawal: "Foil air/gas bearing technology—an overview" ASME International Gas Turbine & Aeroengine Congress & Exhibition, Jun. 2, 1997-Jun. 5, 1997, pp. 1-11, New York.
Corrugate—Definition and More from the Free Merriam-Webster Dictionary, <http://www.merriam-webster.com/dictionary/corrugate?show=0&t=1413824164[Oct. 20, 2014 9:57:18 AM]>, 1 page.
Cylinder—Definition and More from the Free Merriam-Webster Dictionary, <http://www.merriam-webster.com/dictionary/cylinder[Oct. 20, 2014 10:00:24 AM]>, 2 pages.
External—Definition and More from the Free Merriam-Webster Dictionary, <http://www.merriam-webster.com/dictionary/external[Oct. 20, 2014 10:36:22 AM]>, 3 pages.
Axial—Definition and More from the Free Merriam-Webster Dictionary, <http://www.merriam-webster.com/dictionary/axial[Oct. 20, 2014 10:38:55 AM]>, 1 page.
Surface—Definition and More from the Free Merriam-Webster Dictionary, <http://www.merriam-webster.com/dictionary/surface?show=0&t=1413826865[Oct. 20, 2014 10:41:01 AM]>, 3 pages.
Interior—Definition and More from the Free Merriam-Webster Dictionary, <http://www.merriam-webster.com/dictionary/interior[Oct. 20, 2014 10:43:25 AM]>, 2 pages.
Bore—Definition and More from the Free Merriam-Webster Dictionary, <http://www.merriam-webster.com/dictionary/bore>, 2 pages.
Bushing—Definition and More from the Free Merriam-Webster Dictionary, <http://www.merriam-webster.com/dictionary/bushing>, 1 page.
Avallone, Eugene A. et al., Eds., "Marks' Standard Handbook for Mechanical Engineers", Tenth Edition, McGraw-Hill, New York, 1996, 3 pages.
Slayne, A.R., "Performance Characteristics of Actuator / Bearing Joints Made with Tolerance Rings", Rencol Tolerance Rings, Bristol, UK, 2002, 2 pages.
Shigley, Joseph E. et al., Eds., "Standard Handbook of Machine Design", Third Edition, McGraw-Hill, New York, 2004, 2 pages.
Avallone, Eugene A. et al., Eds., "Marks' Standard Handbook for Mechanical Engineers", Tenth Edition, McGraw-Hill, New York, 1996, 4 pages.
Smith, J.W., "Tolerance Rings", IEEE Industry Applications Magazine, Sep./Oct. 2002, 9 pages.
"List of Defunct Hard Disk Manufacturers", <http://en.wikipedia.org/wiki/List_of_defunct_hard_disk_manufacturers>, Oct. 15, 2014, 6 pages.
Coughlin, Tom, "Declining Growth Projections for Hard Disk Drive Industry in 2013", <http://www.forbes.com/sites/tomcoughlin/2013/05/10/2013-hard-disk-drive-projections/>, Oct. 13, 2014, 3 pages.
"Petitioner's Exhibit 1009", Case IPR2014-00309, Intri-Plex and MMI Holdings, Aug. 19, 2014, 7 pages(Exhibit 1009 cited in IPR).
Saint-Gobain's Response to Office Action for U.S. Appl. No. 10/552,875, dated Dec. 23, 2009, 21 pages (Exhibit 1010 cited in IPR).
"Why Use a Tolerance Ring?", Rencol Tolerance Rings, Saint-Gobain Performance Plastics, Sep. 8, 2014, 35 pages (Exhibit 1014 cited in IPR).
U.S. National Phase U.S. Appl. No. 10/552,875, dated Oct. 13, 2005, 45 pages (Exhibit 1015 cited in IPR).
Drawings of Woodhead during Deposition on Sep. 5, 2014, Intri-Plex and MMI Holdings, 1 page (Exhibit 1016 cited in IPR).
Office Action dated Apr. 15, 2009 and Examiner's Summary of Interview dated May 19, 2009 for U.S. Appl. No. 10/552,875, 22 pages (Exhibit 1017 cited in IPR).
Examiner's Summary of Interview for U.S. Appl. No. 10/552,875, dated Jul. 23, 2014, 3 pages (Exhibit 1018 cited in IPR).
Deposition Transcript of Nigel Misso, vol. 1, Sep. 12, 2014, 255 pages (Exhibit 1023 cited in IPR).
Deposition Transcript of Niki Samuel Woodhead, vol. 1, Sep. 15, 2014, 289 pages (Exhibit 1024 cited in IPR).
Deposition Transcript of Andrew Robert Slayne, vol. 1, Sep. 16, 2014, 264 pages (Exhibit 1025 cited in IPR).
Deposition Transcript of Alexander Henry Slocum, Ph.D., vol. 1, Sep. 26, 2014, 324 pages (Exhibit 1026 cited in IPR).
Amendment in Response to Non-Final Office Action for U.S. Appl. No. 10/552,875, dated Aug. 21, 2007, 13 pages (Exhibit 1027 cited in IPR).
Final Office Action for U.S. Appl. No. 10/552,875, dated Feb. 13, 2008, 12 pages (Exhibit 1028 cited in IPR).
Amendment After Final Action for U.S. Appl. No. 10/552,875, dated Apr. 15, 2008, 20 pages (Exhibit 1029 cited in IPR).
Amendments and Submission for U.S. Appl. No. 10/552,875, dated Jun. 29, 2010, 10 pages (Exhibit 1030 cited in IPR).
Request for Pre-Appeal Brief Conference for U.S. Appl. No. 10/552,875, dated Nov. 8, 2013, 6 pages (Exhibit 1031 cited in IPR).
Application for U.S. Appl. No. 12/870,978, Issued as U.S. Pat. No. 8,228,640, cited in IPR Oct. 21, 2014, 27 pages (Exhibit 1032 cited in IPR).
"Declaration of Ryan Schmidt", Case IPR2014-00309, Intri-Plex and MMI Holdings, dated Oct. 21, 2014, 12 pages (Exhibit 1033 cited in IPR).
Customer Print Having Tolerance Ring Specifications, Intri-Plex and MMI Holdings, dated Jun. 28, 2014, 1 page (Exhibit 1034 cited in IPR).
Chart re Market Share of Leading HDD Manufacturers, Intri-Plex and MMI Holdings, cited in IPR Oct. 21, 2014, 1 page (Exhibit 1037 cited in IPR).
Declaration of Michael McCarthy, Case IPR2014-00309, Intri-Plex and MMI Holdings, dated Oct. 21, 2014, 52 pages (Exhibit 1038 cited in IPR).
Protrusion—Definition and More from the Free Merriam-Webster Dictionary, <http://www.merriam-webster.com/dictionary/protrusion[Oct. 20, 2014 9:55:00 AM]>, 2 pages.
Chart re Total Shipment of 2.5 inch HDD's, Intri-Plex and MMI Holdings, cited in IPR Oct. 21, 2014, 1 page (Exhibit 1054 cited in IPR).
Non-Final Office Action for U.S. Appl. No. 10/552,875, dated May 21, 2007, 12 pages (Exhibit 2002 cited in IPR).
Invention Disclosure, Case IPR2014-00309, *Intri-Plex* v. *Saint-Gobain*, cited in IPR Aug. 11, 2014, 3 pages (Exhibit 2004 cited in IPR).
Screenshot to Metadata to Exhibit 2004, Case IPR2014-00309, *Intri-Plex* v. *Saint-Gobain*, cited in IPR Aug. 11, 2014, 1 page (Exhibit 2005 cited in IPR).
HDD R and D Review (Redacted), Case IPR2014-00309, *Intri-Plex* v. *Saint-Gobain*, cited in IPR Aug. 11, 2014, 3 pages (Exhibit 2007 cited in IPR).
RING5579A Concept Drawing (Redacted), Case IPR2014-00309, *Intri-Plex* v. *Saint-Gobain*, cited in IPR on Aug. 11, 2014, 2 pages (Exhibit 2008 cited in IPR).
RING5346D Concept Drawing (Redacted), Case IPR2014-00309, *Intri-Plex* v. *Saint-Gobain*, cited in IPR on Aug. 11, 2014, 1 page (Exhibit 2009 cited in IPR).
Technical Report (Redacted), Case IPR2014-00309, *Intri-Plex* v. *Saint-Gobain*, cited in IPR on Aug. 11, 2014, 2 pages (Exhibit 2010 cited in IPR).
"IPT Sequoia Ring Comparison", Saint-Gobain Performance Plastics, cited in IPR on Aug. 11, 2014, 6 pages, (Exhibit 2011 cited in IPR).
Declaration of Nik Woodhead (Redacted), Case IPR2014-00309, *Intri-Plex* v. *Saint-Gobain*, dated Aug. 8, 2014, 33 pages (Exhibit 2017 cited in IPR).

(56) References Cited

OTHER PUBLICATIONS

Declaration of Andy Slayne (Redacted), Case IPR2014-00309, *Intri-Plex* v. *Saint-Gobain*, dated Aug. 8, 2014, 25 pages (Exhibit 2018 cited in IPR).
Declaration of Nigel F. Misso, Case IPR2014-00309, *Intri-Plex* v. *Saint-Gobain*, dated Aug. 7, 2014, 7 pages (Exhibit 2019 cited in IPR).
Declaration of Alexander H . Slocum, Case IPR2014-00309, *Intri-Plex* v. *Saint-Gobain*, dated Aug. 8, 2014, 47 pages (Exhibit 2020 cited in IPR).
RING5579A Concept Drawing (Redacted), Case IPR2014-00309, *Intri-Plex* v. *Saint-Gobain*, cited in IPR Sep. 3, 2014, 2 pages (Exhibit 2023 cited in IPR).
RING5346D Concept Drawing (Redacted), Case IPR2014-00309, *Intri-Plex* v. *Saint-Gobain*, cited in IPR Sep. 3, 2014, 1 page (Exhibit 2024 cited in IPR).
Declaration of Nik Woodhead (Redacted), Case IPR2014-00309, *Intri-Plex* v. *Saint-Gobain*, dated Aug. 8, 2014, 33 pages (Exhibit 2025 cited in IPR).
Declaration of Andy Slayne (Redacted), Case IPR2014-00309, *Intri-Plex* v. *Saint-Gobain*, dated Aug. 8, 2014, 24 pages (Exhibit 2026 cited in IPR).
Corrected Declaration of Andy Slayne (Redacted), Case IPR2014-00309, *Intri-Plex* v. *Saint-Gobain*, dated Aug. 8, 2014, 25 pages (Exhibit 2026 cited in IPR).
Declaration of Michael A. Albert in Support of Motion for Admission Pro Hac Vice, Case IPR2014-00309, *Intri-Plex* v. *Saint-Gobain*, dated Sep. 9, 2014, 4 pages (Exhibit 2027 cited in IPR).
Kim, Michael W. et al, Administrative Patent Judges, "Decision—Institution of Inter Partes Review", dated Jun. 10, 2014, 13 pages (cited in IPR).
Motion to Seal and for Entry of Protective Order, Case IPR2014-00309, dated Aug. 11, 2014, 9 pages (cited in IPR).
Patent Owner's Motion to Expunge, Case IPR2014-00309, dated Sep. 5, 2014, 10 pages (cited in IPR).
Order Denying Petitioner's Motion for Discovery, Case IPR2014-00309, dated Sep. 4, 2014, 13 pages (cited in IPR).
Petitioner's Opposition to Patent Owner's Motion to Seal and for Entry of Proposed Protective Order, Case IPR2014-00309, dated Aug. 19, 2014, 14 pages (cited in IPR).
Opposition to Petitioner's Motion for Additional Discovery, Case IPR2014-00309, dated Aug. 28, 2014, 14 pages (cited in IPR).
Decision—Denying Patent Owner's Request for Rehearing and Order on Conduct of Proceeding, Case IPR2014-00309, dated Jul. 3, 2014, 4 pages (cited in IPR).
Order—On Motion to Seal and for Entry of Protective Order and Notice of Revised Scheduling Order, Case IPR2014-00309, dated Aug. 27, 2014, 10 pages (cited in IPR).
Petition for Inter Partes Review Under 37 C.F.R. 42.100, dated Dec. 27, 2013, 58 pages (cited in IPR).
Patent Owner's Preliminary Response, 37 C.F.R. 42.107, Case IPR2014-00309, dated Apr. 15, 2014, 69 pages (cited in IPR).
Request for Rehearing Under 37 C.F.R. 42.71(d), Case IPR2014-00309, dated Jun. 24, 2014, 12 pages (cited in IPR).
Patent Owner's Response, 37 C.F.R. 42.120, Case IPR2014-00309, dated Aug. 11, 2014, 67 pages (cited in IPR).
Amended Patent Owner's Response, 37 C.F.R. 42.120, Case IPR2014-00309, dated Sep. 3, 2014, 67 pages (cited in IPR).
Petitioner's Reply to Patent Owner's Response, Case IPR2014-00309, dated Oct. 21, 2014, 20 pages (cited in IPR).
Secured Note Offering by MMI International Part 1, *Intri-Plex* v. *Saint-Gobain*, IPR2014-00309, dated Nov. 11, 2014, 158 pages (Exhibit 2030 part 1 cited in IPR).
Secured Note Offering by MMI International Part 2, *Intri-Plex* v. *Saint-Gobain*, IPR2014-00309, dated Nov. 11, 2014, 133 pages (Exhibit 2030 part 2 cited in IPR).
Secured Note Offering by MMI International Part 3, *Intri-Plex* v. *Saint-Gobain*, IPR2014-00309, dated Nov. 11, 2014, 194 pages (Exhibit 2030 part 3 cited in IPR).
Marked Up IPT Exhibit 1034, *Intri-Plex* v. *Saint-Gobain*, IPR2014-00309, dated Nov. 11, 2014, 1 page (Exhibit 2031 cited in IPR).
Figure of Exhibit 1002 and Figure Representative of Bushing of Exhibit 1002 discussed during J. Michael McCarthy Deposition, *Intri-Plex* v. *Saint-Gobain*, IPR2014-00309, dated Nov. 12, 2013, 1 page (Exhibit 2032 cited in IPR).
Figure Representative of the Bushing of Exhibit 1002 and Annotated Figure of Exhibit 1002 discussed during J. Michael McCarthy Deposition, *Intri-Plex* v. *Saint-Gobain*, IPR2014-00309, dated Nov. 12, 2014, 1 page (Exhibit 2033 cited in IPR).
Figure of Exhibit 1002 and Annotated Figure of Exhibit 1002 discussed diruing J. Michael McCarthy Deposition, *Intri-Plex* v. *Saint-Gobain*, IPR2014-00309, dated Nov. 12, 2014, 1 page (Exhibit 2034 cited in IPR).
Annotated Figures of Exhibit 1002 discussed during J. Michael McCarthy Deposition, *Intri-Plex* v. *Saint-Gobain*, IPR2014-00309, dated Nov. 12, 2014, 1 pages (Exhibit 2035 cited in IPR).
Figure Representative of Bushing of Exhibit 1002, Annotated Figures of Exhibit 1002 discussed during J. Michael McCarthy Deposition, *Intri-Plex* v. *Saint-Gobain*, IPR2014-00309, dated Nov. 12, 2014, 1 page (Exhibit 2036 cited in IPR).
Excerpts from McGraw-Hill Dictionary of Scientific and Technical Terms, Sixth Edition (copyright 2003), *Intri-Plex* v. *Saint-Gobain*, IPR2014-00309, dated Nov. 12, 2014, 10 pages (Exhibit 2037 cited in IPR).
Deposition Transcript of Ryan Schmidt, Reported by: Michelle Graciano, CSR No. 13572, *Intri-Plex* v. *Saint-Gobain*, IPR2014-00309, dated Nov. 11, 2014, Costa Mesa, CA, 90 pages (Exhibit 2038 cited in IPR).
Deposition Transcript of J. Michael McCarthy, Ph.D., Reported by: Michelle Graciano, CSR No. 13572, *Intri-Plex* v. *Saint-Gobain*, IPR2014-00309, dated Nov. 12, 2014, 93 pages (Exhibit 2039 cited in IPR).
Patent Owner's Motion for Observations on the Cross Examination of Mr. Ryan Schmidt and Dr. Michael McCarthy, *Intri-Plex* v. *Saint-Gobain*, IPR2014-00309, dated Nov. 21, 2014, 13 pages (cited in IPR).
Patent Owner's Motion to Exclude Evidence Under 37 C.F.R. 42.64, *Intri-Plex* v. *Saint-Gobain*, IPR2014-00309, dated Nov. 21, 2014, 17 pages (cited in IPR).
Attachment A to Patent Owners Motion to Exclude Evidence, *Intri-Plex* v. *Saint-Gobain*, IPR2014-00309, dated Oct. 28, 2014, 21 pages (cited in IPR).
Petitioner's Motion to Exclude Patent Owner's Exhibits 2030 and 2032-2036, *Intri-Plex* v. *Saint-Gobain*, IPR2014-00309, dated Nov. 21, 2014, 4 pages (cited in IPR).
Patent Owner's Motion to Seal, *Intri-Plex* v. *Saint-Gobain*, IPR2014-00309, dated Nov. 21, 2014, 4 pages (cited in IPR).
Petitioner's Request for Oral Hearing, *Intri-Plex* v. *Saint-Gobain*, IPR2014-00309, dated Nov. 21, 2014, 4 pages (cited in IPR).
Patent Owner's Request for Oral Hearing, *Intri-Plex* v. *Saint-Gobain*, IPR2014-00309, dated Nov. 21, 2014, 4 pages (cited in IPR).
D.E. Whitney, "Quasi-Static Assembly of Compliantly Supported Rigid Parts," Journal of Dynamic Systems, Measurement, and Control, Mar. 1982, vol. 104, pp. 65-77.
Tomas Lozano-Perez et al., "Automatic Synthesis of Fine-Motion Strategies for Robots," The International Journal of Robotics Research, vol. 3, No. 1, Spring 1984, pp. 3-24.
Petitioner's Reply to Patent Owner's Opposition to Motion to Exclude Exhibits 2030 and 2032-2036, Case IPR2014-00309, *Intri-Plex* v. *Saint-Gobain*, dated Dec. 22, 2014, 9 pages (Cited in IPR).
Patent Owner's Reply in Support of its Motion for Sanctions for Petitioner's Violation of the Protective Order, Case IPR2014-00309, *Intri-Plex* v. *Saint-Gobain*, dated Dec. 23, 2014, 9 pages (Cited in IPR).
Declaration of Ryan Schmidt Pursuant to Conduct of the Preceding Order (Paper 62), and Order Correcting Paper 62 (Paper 64), Case IPR2014-00309, *Intri-Plex* v. *Saint-Gobain*, dated Dec. 4, 2014, 7 pages (Exhibit 2040 cited in IPR).

(56) References Cited

OTHER PUBLICATIONS

Declaration of Nik Woodhead in Support of Motion for Sanctions for Violation of Protective Order, Case IPR2014-00309, *Intri-Plex v. Saint-Gobain*, dated Dec. 12, 2014, 6 pages (Exhibit 2041 cited in IPR).
Patent Owner's Motion for Sanctions for Petitioner's Violation of the Protective Order, Case IPR2014-00309, *Intri-Plex v. Saint-Gobain*, dated Dec. 12, 2014, 10 pages (Cited in IPR).
Petitioner's Opposition to Patent Owner's Motion for Observations on the Cross-Examination of Mr. Ryan Schmidt and Dr. J. Michael McCarthy, Case IPR2014-00309, *Intri-Plex v. Saint-Gobain*, dated Dec. 8, 2014, 17 pages (Cited in IPR).
Petitioner's Opposition to Patent Owner's Motion for Sanctions, Case IPR2014-00309, *Intri-Plex v. Saint-Gobain*, dated Dec. 19, 2014, 10 pages (Cited in IPR).
Petitioner's Opposition to Patent Owner's Motion to Exclude Evidence, Case IPR2014-00309, *Intri-Plex v. Saint-Gobain*, dated Dec. 8, 2014, 18 pages (Cited in IPR).
Patent Owner's Opposition to Petitioner's Motion to Exclude Exhibits 2030 and 2032-2036, Case IPR2014-00309, *Intri-Plex v. Saint-Gobain*, dated Dec. 8, 2014, 13 pages (Cited in IPR).
Order—Conduct of the Proceeding—37 C.F.R. 42.25, 37 C.F.R. 42.54, Case IPR2014-00309, *Intri-Plex v. Saint-Gobain*, dated Nov. 26, 2014, 5 pages (Cited in IPR).
Order—Conduct of the Proceeding—37 C.F.R. 42.5, Case IPR2014-00309, *Intri-Plex v. Saint-Gobain*, dated Dec. 18, 2014, 4 pages (Cited in IPR).
Order—Correcting Paper 62 Order—37 C.F.R. 42.5, Case IPR2014-00309, *Intri-Plex v. Saint-Gobain*, dated Dec. 2, 2014, 2 pages (Cited in IPR).
Order—On Motion to Expunge and Motion to Seal—37 C.F.R. 42.14 and 42.54, Case IPR2014-00309, *Intri-Plex v. Saint-Gobain*, dated Dec. 9, 2014, 10 pages (Cited in IPR).
Order—Trial Hearing—37 C.F.R. 42.70, Case IPR2014-00309, *Intri-Plex v. Saint-Gobain*, dated Dec. 2, 2014, 4 pages (Cited in IPR).
Patent Owner's Reply Memorandum in Support of its Motion to Exclude Evidence, Case IPR2014-00309, *Intri-Plex v. Saint-Gobain*, dated Dec. 22, 2014, 9 pages. (Cited in IPR).
Patent Owner's Demonstratives, Case IPR2014-00309, *Intri-Plex v. Saint-Gobain*, dated Jan. 15, 2015, pp. 1-100 (Exhibit 2042 cited in IPR).
Patent Owner's Motion to Seal the Confidential, Unredacted Versions of Exhibits 1024 and 1025, Case IPR2014-00309, *Intri-Plex v. Saint-Gobain*, dated Jan. 9, 2015, pp. 1-14 (Cited in IPR).
Patent Owner's Notice of Supplemental Authority, Case IPR2014-00309, *Intri-Plex v. Saint-Gobain*, dated Jan. 8, 2015, pp. 1-3 (Cited in IPR).
Patent Owner's Submission of Demonstrative Exhibits, Case IPR2014-00309, *Intri-Plex v. Saint-Gobain*, dated Jan. 12, 2015, pp. 1-3 (Cited in IPR).
Petitioner's Opposition to Patent Owner's Motion to Seal Unredacted Portions of Deposition Transcripts of Andrew Slayne and Nik Woodhead in Exhibits 1024 and 1025, Case IPR2014-00309, *Intri-Plex v. Saint-Gobain*, dated Jan. 13, 2015, pp. 1-10 (Cited in IPR).
Patent Owner's Reply in Support of its Motion to Seal the Confidential, Unredacted Versions of Exhibits 1024 and 1025, Case IPR2014-00309, *Intri-Plex v. Saint-Gobain*, dated Jan. 20, 2015, pp. 1-9 (Cited in IPR).
Record of Oral Hearing before Michael W. Kim, William A. Capp, and Frances L. Ippolito, Administrative Patent Judges, held Jan. 15, 2015, Case IPR2014-00309, *Intri-Plex v. Saint-Gobain*, pp. 1-78 (Cited in IPR).
International Search Report from PCT Application No. PCT/US2012/030143, dated Oct. 31, 2012, 1 pg.
Final Written Decision, 35 U.S.C. 318(a) and 37 C.F.R. 42.73, Case IPR2014-00309, *Intri-Plex v. Saint-Gobain*, dated Mar. 23, 2015, 50 pages (Cited in IPR).

\* cited by examiner

METHOD OF USING A TOLERANCE RING

CROSS-REFERENCE TO RELATED APPLICATIONS

This application is a continuation of and claims priority to U.S. Non-Provisional patent application Ser. No. 10/552,875, entitled "TOLERANCE RING ASSEMBLY," which was a U.S. national phase application under 35 U.S.C. § 371 of International Patent Application No. PCT/GB2004/001681, filed Apr. 16, 2004, and claims priority to Great Britain Patent Application No. 0308957.0, filed Apr. 17, 2003, naming inventors Niki S. Woodhead and Andrew R. Slayne, which application is incorporated herein by reference in its entirety. The International Application was published in English on Nov. 4, 2004 as WO 2004/094852 A1 under PCT Article 21(2).

FIELD OF THE DISCLOSURE

This invention relates to tolerance ring assemblies, wherein a tolerance ring provides an interference fit between parts of an assembly, where a first part has a cylindrical portion located in a cylindrical bore of a second part. The invention particularly relates to assemblies having a tolerance ring that provides an interference fit between a cylindrical component such as a shaft or a bearing and a housing for the shaft.

DESCRIPTION OF THE RELATED ART

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the centre of the ring. Usually, the protrusions are formations, possibly regular formations, such as corrugations, ridges or waves.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft or a bearing.

Problems can occur during assembly of parts that use tolerance rings. As the tolerance ring requires a tight fit in the apparatus, there may be abrasion between the ring and various parts of the apparatus, which removes small fragments from the surface of the affected parts. These fragments are known in the art as particles. In particular, parts of the protrusions distal to the band of the ring may generate particles when sliding relative to part(s) of the apparatus. In certain apparatus, such as a computer hard disk drive where cleanliness is essential, production of particles is extremely undesirable, as the particles can adversely affect the function of the apparatus.

If the material of the housing (e.g. aluminum) is softer than the material of the shaft (e.g. steel), it may be desirable to have the protrusions slide relative to the shaft during assembly to minimise particle production. Normally, for this type of arrangement, the tolerance ring's protrusions point inwards.

For apparatus that includes a bearing, however, it may also be desirable that the bearing has the tolerance ring fitted thereto, and the protrusions engage the surface of the bearing in the housing i.e. the protrusions point outwards. The arrangement may be useful where the tolerance ring distributes torque from the housing to the bearing, as load is distributed evenly over a large contact area of the shaft provided by the tolerance ring. Where the surface area is not maximized, for example when the protrusions engage the bearing under load, there may be problems with an effect known as "torque ripple" where the torque in the bearing is not generated at a continuous level. It is preferable that load is distributed over as large an area as possible, for example over the base of the protrusions of the tolerance ring.

It may be advantageous to provide in the bore a tolerance ring with outward protrusions and fit the shaft into the ring. In this arrangement, although there may be reduced particle production as the protrusions do not slide relative to an apparatus component, particles may still be produced, as the end of the shaft may rub against the rim of the tolerance ring during assembly owing to the tight fit between the tolerance ring and the shaft.

Alternatively, it may be advantageous to fit a tolerance ring with inward protrusions to the shaft, and insert the shaft and tolerance ring into the bore. Although the inward protrusions do not rub against the surface of the bore, particles may be produced when the rim of the tolerance ring rubs against the edge of the bore in the housing, owing to the tight fit between the ring and the housing.

The need to reduce or eliminate particle production can therefore impose restrictions on the type of tolerance ring used. The tolerance ring that minimizes particle production may not be the best choice for operation of the apparatus.

SUMMARY

Therefore, at its most general, the present invention proposes that the tolerance ring has a guide portion defining a surface inclined relative to the axis of the tolerance ring which can act as a guide when the tolerance ring is inserted in a bore or when a shaft is mounted in the tolerance ring. In the former case, the surface will be inclined outwardly whereas in the latter case it will be inclined inwardly. In either situation, the guide portion assists the assembly of the various components, but reduces or eliminates particle production.

Thus, according to a first aspect of the invention, there may be provided a tolerance ring comprising a band of resilient material having corrugated protrusions extending either radially outwards from the band or radially inwards towards the axis of the band; and a guide portion contiguous with, and extending axially from the band, wherein guide portion comprises at least one guide surface inclined relative to the axis of the band such that the guide free end of the guide portion is wider than the opening of the band when the corrugated protrusions extend radially outwards, and is narrower than the opening of the band when the corrugated protrusions extend radially inwards.

The angle of inclination of the at least one guide surface relative to the axis may be constant along the length of the guide surface, so that the guide surface defines the major part of a frusto-cone. Alternatively, the angle of inclination may change so that the guide surface is curved in an axial section.

An advantage of the present invention is correct assembly of a ring in a bore despite some axial misalignment of the ring and the bore.

The tolerance ring may be made of any suitable resilient material, preferably a metal, most preferably spring steel.

The guide portion may extend from the whole circumference of the band of the ring. Alternatively, the guide portion may extend from at least one segment of the circumference of the tolerance ring. The guide surfaces of the guide portion may be flared relative to the inside surface of the band of the tolerance ring. In one embodiment, the guide surface flares from the band to define an entrance at one end of the tolerance ring, wherein the perimeter or circumference of the entrance is greater than the circumference of the band of the tolerance ring. The guide portion provides a funnel extending from the band of the ring, with the guide surfaces angled relative to the axis of the band.

Conveniently, the guide surfaces of the guide portion are sufficiently free of obstruction so as to guide a shaft inserted axially into the guide portion into the band. If there is axial misalignment of the shaft and the axis of the tolerance ring, the guide surfaces of the guide portion serve to align axially the shaft with the band as the shaft is inserted into the band. The guide portion may include walls that are substantially parallel to the axis of the ring, for example near to the entrance.

Preferably, the entrance of the guide portion is circular or oval shaped. The entrance may be concentric with the band. The entrance may be rectangular or square in shape.

Preferably, the plane of the entrance is substantially perpendicular to the axis of the tolerance ring. Alternatively, the plane of the opening may be slanted relative to the axis of the ring, and a segment of the entrance is axially closer to the band than the rest of the entrance.

Alternatively, the guide surfaces of the guide portion taper towards the axis of the ring to narrow or close the opening of the band. The guide surfaces are provided by the outside surfaces of the guide portion. Ideally, the guide surfaces are sufficiently free of obstruction so as to allow the tolerance ring to be guided into a bore of a housing such that the bore of the housing is concentric with the band of the tolerance ring.

Ideally, the guide surface of any guide portion of the present invention is sufficiently smooth to prevent the production of particles when the guide surface rubs or slides against a shaft and/or the entrance to a bore in a housing. A possible advantage of the present invention is therefore a reduction in the particles normally generated when the tolerance ring is inserted inside a bore and/or fitted onto other apparatus, such as a shaft.

The tolerance ring of the present invention is particularly suited to apparatus where particle production is undesirable, for example the hard disk drive of a computer. Additionally, or alternatively, the present invention may be particularly useful where it is advantageous to distribute tolerance ring loading over as wide an area as possible on a component that has to be inserted into or over the tolerance ring.

Such an apparatus may comprise a housing, which includes a bore, in which bore a tolerance ring of the first aspect of the present invention is fitted such that the band of the tolerance ring is concentric with the bore and the guide portion extends and flares towards the mouth of the bore. The protrusions of the ring preferably extend radially outwards to engage the surface of the bore. A shaft can be inserted into the ring via the entrance provided by the guide portion, to be gripped by the ring. The internal diameter of the band is suitable to grip the shaft. Ideally, the internal diameter of the band is substantially the same as the diameter of the shaft.

The perimeter or circumference of the opening may be of sufficient dimension(s) to allow the opening to be accommodated inside the bore, so that no part of the guide portion protrudes out of the housing.

Alternatively part of, or the entire, guide portion may reside outside of the housing when the ring is in use, owing to the dimension(s) of the opening and/or the axial length of the guide portion. Alternatively, the guide portion may reside inside the housing such that the entrance of the guide portion lies flush with the outside of the housing. Preferably, the entrance of the guide portion is the same dimension and shape as the mouth of the bore.

The housing may be an actuator arm of a hard disk drive. The actuator arm may pivot relative to a bearing or bearing assembly.

The apparatus may comprise a shaft, onto which a tolerance ring of the present invention is fitted, wherein the protrusions of the ring preferably extend radially inwards. The tolerance ring may be fitted to the periphery of the shaft such that the protrusions engage and grip the shaft. The guide portion extends axially, away from the end of the shaft, and tapers to narrow or close the opening of the band. The guide portion preferably narrows the opening of the band but preferably does not taper to a point. Alternatively, the guide portion may taper to a point so that the tolerance ring acts a cap over the end of the shaft. Regardless of the exact shape of the guide portion, the guide surfaces of the guide portion allow the ring (and shaft) to be inserted into the bore of a housing such that the band of the tolerance ring sits concentrically in the bore. The external diameter of the band is sufficient to create a snug fit between the band and the bore. Ideally the external diameter of the band is substantially the same as the diameter of the bore.

Alternatively the apparatus may comprise a housing having a bore, a shaft and a tolerance ring of the first aspect of the invention, wherein at least part of the shaft is located in the bore and the band of the tolerance ring is concentrically located between the part of the shaft in the bore and the surface of the bore.

Preferably the apparatus is a hard disk drive and the shaft is a bearing or bearing assembly and the housing is an actuator arm. Preferably, the actuator arm pivots around the bearing or bearing assembly. Preferably the bearing or bearing assembly remains stationary.

Alternatively, the apparatus may be a torque limiting apparatus such as EPAS or a steering column lock, where slip occurs between the ring and another surface, an electric generator, a centrifugal pump, an air blower, a fan, a crane, woodworking or spinning machinery, a machine tool, a shaker or crusher.

The apparatus may be assembled by fitting a tolerance ring of the first aspect of the invention to a shaft, so that the inwardly extending protrusions of the ring grip the shaft and the guide portion tapers away from the shaft, the guide portion narrowing or closing the opening of the band; and inserting the shaft and ring into the bore of the housing such that the guide portion axially leads into the bore, such that the shaft/tolerance ring sits concentrically inside the bore and the band is sufficiently dimensioned to allow a tight fit between the band and the surface of the bore.

The guide surfaces of the guide portion may correct any axial misalignment between the shaft/ring and the bore.

Alternatively, the apparatus may be assembled by fitting a tolerance ring of the first or second aspect of the invention into a bore of a housing such that the outwardly extending protrusions of the tolerance ring contact the surface of the housing, wherein the band of the tolerance ring is suitably dimensioned to receive and grip a shaft, and the guide portion extends towards the entrance of the bore, the guide portion widening the opening of the band; and inserting a shaft into the guide portion such that the shaft slides into the band/bore to implement an interference fit between the ring and the shaft.

The guide surface(s) of the guide portion may correct any axial misalignment between the shaft and the tolerance ring/bore.

There may be a chamfer or flare at the mouth of the bore relative to the sides of the main section of the bore. This chamfer may act as a further guide, particularly in embodiments which the tolerance ring is mounted on a shaft prior to insertion in the bore. Such chamfers are, in themselves, already known.

A further aspect of the invention provides a blank for making tolerance ring of the first aspect. The blank comprises a strip of resilient material, in which the corrugated protrusions are formed, and having the guide portion inclined relative to the plane of the rest of the strip. The resulting blank may subsequently be curved into a substantially an annular shape corresponding to the tolerance ring of the first aspect with a gap between the ends of the strip.

BRIEF DESCRIPTION OF THE DRAWINGS

Embodiments of the present invention will now be described in detail, by way of example, reference to the accompanying drawings, in which.

DETAILED DESCRIPTION

Figure 2:
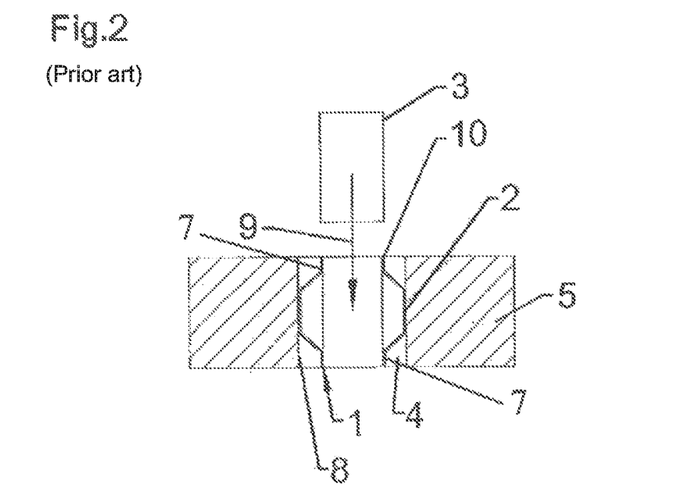
FIG. 2 shows in cross section another known tolerance ring with outward protrusions located in a bore in an actuator arm, and a bearing ready to be inserted into the tolerance ring.
Figure 3:
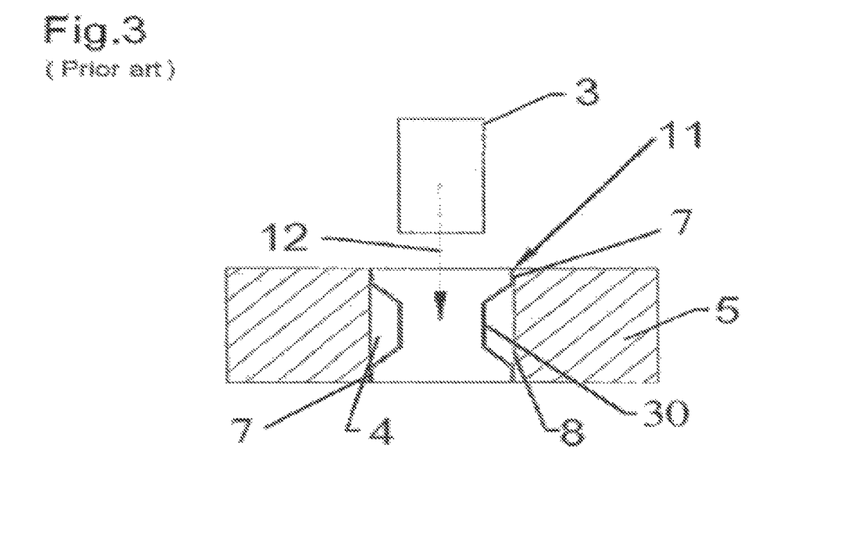
FIG. 3 shows in cross section another known tolerance ring with inward protrusions located in a bore in an actuator arm, and a bearing ready to be inserted into the tolerance ring.

Before describing embodiments of the invention, it will be useful to understand conventional arrangements. Thus, FIGS. 1 to 3 illustrate use of a known tolerance ring to mount a shaft in a bore.

Figure 1:
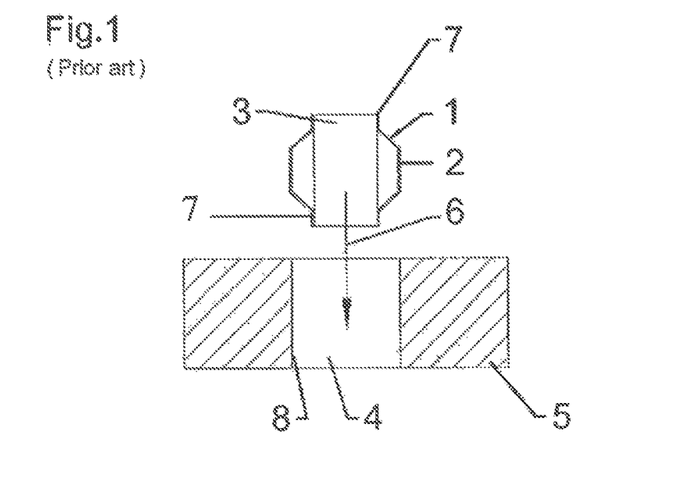
FIG. 1 shows in cross section a bearing and a known tolerance ring, which are about to be inserted into a bore in a pivotable actuator arm of a hard disk drive.

Thus, as shown in FIG. 1, a known tolerance ring with outwardly facing protrusions 2 in the form of waves and is fitted around a bearing 3 or bearing assembly 3 (hereinafter referred to as the bearing 3). The bearing 3 and tolerance ring 1 comprise a sub-assembly, which is axially inserted into the bore 4 of a body which may be an actuator arm 5 of a hard disk drive, indicated in FIG. 1 by the arrow 6. Unformed, annular portions 7 of the tolerance ring 1, which have no radial protrusions, axially flank the outwardly facing protrusions 2. Tolerance rings with outwardly facing protrusions are generally known in the art as S.V rings (Shaft Variable), as the diameter of the tolerance ring to be fitted to the bearing may be varied by differing amounts of overlap of the ends of the strip that forms the tolerance ring. The outwardly facing protrusions 2 of the ring 1 resiliently engage the surface 8 of the bore 4.

As the sub-assembly is inserted into the bore 4, the outwardly facing protrusions 2 of the tolerance ring 1 are compressed. Unformed portions 7 of the tolerance ring 1 that axially flank the outwardly facing protrusions 2 prevent changes in the pitch of the outwardly facing protrusions 2, allowing only resilient deformation of each outwardly facing protrusions. A radial force is created between the surface 8 of the bore 4 and the bearing 3. An interference fit is thus provided by the tolerance ring 1.

During assembly, the outwardly facing protrusions 2 of the tolerance ring 1 slide relative to the surface 8 of the bore 4. Abrasion of the waves against the surface 8 can cause small fragments of the housing 5 to be removed from the surface 8 of the bore 4 (and possibly tolerance ring 1). This problem is compounded if the material of the actuator arm 5 is softer than the material of the outwardly facing protrusions 2 of the ring 1. The fragments are known in the art as particles, which can adversely affect the operation of the apparatus in which the tolerance ring 1 is fitted. In the example, particles are extremely undesirable as cleanliness is important for proper functioning of the hard disk drive.

An alternative known assembly method comprises inserting the tolerance ring 1 into the bore 4 so that the tolerance ring 1 sits concentrically in the bore 4. The bearing 3 is inserted into the bore 4 and slides into the tolerance ring 1, as shown by the arrow 9 in FIG. 2. The bearing 3 may foul on the edge 10 of the ring as the bearing 3 is axially inserted into the ring 1, causing fragments of the ring 1 and/or bearing 3 to be removed. The fragments are known in the art as particles.

Particles may also be produced when using a tolerance ring with inwardly extending protrusions, for example as shown FIG. 3. A tolerance ring 11, with inwardly facing protrusions 30, sits concentrically in the bore 4 of the actuator arm 5, with the sides of the ring engaging the sides 8 of the bore 4. This type of ring is known in the art as an H.V. tolerance ring (Housing Variable). A bearing 3 is axially inserted into the ring 11, as indicated in FIG. 3 by the arrow 12. The bearing 3 moves relative to the inwardly facing protrusions 30. As the bearing 3 is made of harder material than the actuator arm 5, particle production is more limited.

The arrangement using a tolerance ring with inwardly extending waves may not be suitable for all types of apparatus, for example where it is desirable to have a load on the bearing spread over a wider area than can be provided by the tops of the waves. It is undesirable that a requirement to minimise particle production during assembly imposes a working arrangement that is sub-optimal for the apparatus.

In a computer hard disk drive the arrangement using a tolerance ring with inwardly extending waves (H.V) is undesirable, as load must be spread over as wide an area of the bearing as possible to avoid torque ripple. Furthermore, axial alignment, required in a hard disk drive, is usually better with tolerance rings having outwardly extending waves (S.V), shown in FIGS. 1 and 2. However, manufacturers may use the H.V ring and assembly method described in Example 3, as it minimizes particle production during assembly. Particles will adversely affect the functioning of the hard disk drive.

Figure 4:
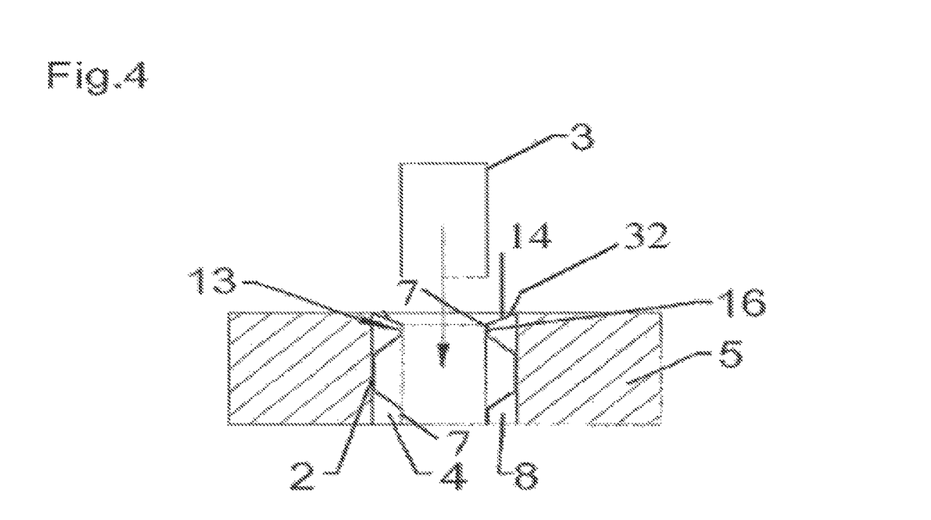
FIG. 4 shows in cross section a tolerance ring of the present invention located in a bore in an actuator arm, and a bearing ready to be inserted into the tolerance ring.

As had previously been mentioned, a tolerance ring according to the present invention modifies known tolerance rings by providing a guide portion which is inclined relative to the axis of the tolerance ring. The first embodiment of the present invention will now be described with reference to FIG. 4. Some of the features of the tolerance ring of this embodiment are the same in the tolerance rings described previously, and the same reference numerals will be used to indicate corresponding parts.

A tolerance ring 13 being the first embodiment of the present invention allows a tolerance ring with outwardly facing protrusions 2 to be used in the apparatus but minimizes or eliminates the particle production that results from the arrangements shown in FIGS. 1, 2 and 3. The tolerance ring 13 includes a guide portion indicated generally in FIG. 4 by 14. The guide portion 14 resembles a funnel, which flares towards the entrance of the bore 4. The guide portion comprises a flared guide surface, indicated in cross section by 15 in FIG. 4, extending axially from the band 16 of the ring 13, forming an endmost annular portion, towards the entrance of the bore 4. The guide portion terminates at free end 32 defining an axial end of the tolerance ring. This free end 32 defines an opening that (i) is larger than that defined by the unformed annular portions of the band, and (ii) has a diameter at said free end that is not greater than the diameter of the protrusions. As shown, the guide portion is provided at only one end of the band.

The guide surface 15 provides an enlarged entrance to the band 16 of the ring 13 for receiving the bearing, eliminating foul on the edge of the ring as described in Example 2. Guide surface 15 is sufficiently smooth so as to guide the bearing 3 into the ring 13, even if there is some axial misalignment of the bearing 3 and the ring 13. As the outwardly facing protrusions 2 of the ring 13 do not abrade against any surface during assembly and the end of the bearing 3 does not abrade against the ring 13, particle production is avoided. As shown, the tolerance ring 13 in the form of an annular band of resilient material has an innermost surface defined by the unformed annular portions 7, and has an outermost surface defined by the outwardly facing protrusions 2 having a diameter. All of the outwardly facing protrusions 2 extend radially outward, each extending between a pair of unformed annular portions. The guide portion is contiguous with and extends axially and radially outward from an endmost unformed annular portion (the topmost unformed annular portion shown in FIG. 4), and flares outwardly from the innermost surface. As shown, the guide portion has a free end defining an opening that has a diameter not greater than the diameter of the unformed annular portions. The arrangement using an S.V. type ring is preferable for the hard disk drive.

Figure 5:
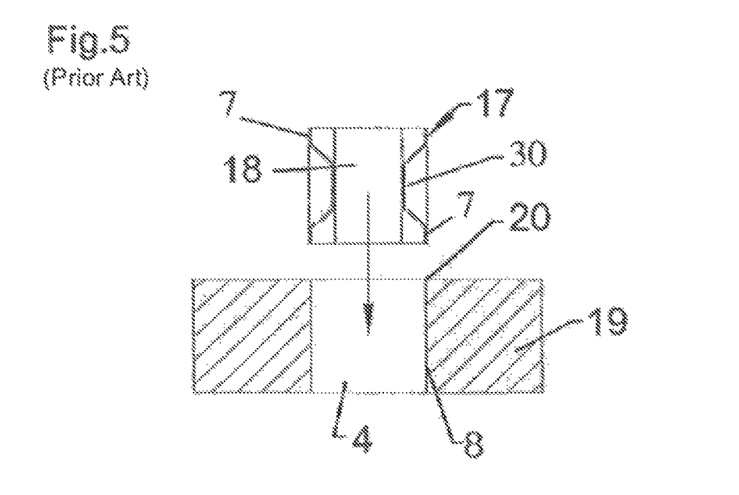
FIG. 5 shows in cross section, another known tolerance ring which is fitted to the end of a shaft and is about to be inserted into a bore in a housing.

It is also known to use a tolerance ring with inwardly facing protrusions. The ring may be fitted to the end of a shaft and inserted into a bore in the housing, as shown in FIG. 5. The tolerance ring 17, with inwardly facing protrusions 2, is fitted to a shaft 18 and the shaft 18 and ring 17 inserted axially into the bore 4 of a housing 19. The diameter of the ring 17 is similar to the diameter of the bore 4 and so the ring 17 fouls on the edge 20 of the bore 4, producing particles from the ring 17 and/or the housing 19.

This known tolerance ring can be modified by the provision of an inclined guide portion, in a manner similar to the first embodiment, but with the angle of inclination being inward rather than outward. Such an embodiment is illustrated in FIG. 6, and again reference numerals are used to indicate corresponding parts. Tolerance ring 21 of the second embodiment is fitted to a shaft 18, and axially inserted into the bore 4 of a housing 19. The ring 21 includes inward protrusions in the form of waves to the grip shaft 18.

Figure 6:
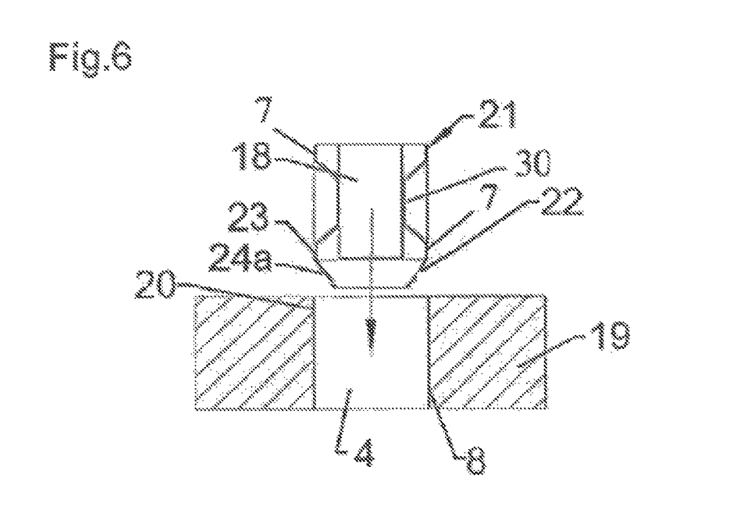
FIG. 6 shows in cross section a tolerance ring of the present invention, which is fitted to a shaft and is about to be inserted in a bore into a housing.

The ring includes a tapered guide portion indicated generally in FIG. 6 by 22, extending axially from the band 23 of the ring, away from the shaft 18. The guide portion comprises a guide surface, indicated in cross section in FIG. 6 by 24a, sloping towards the axis of the ring to narrow the opening of the band 23. The guide surface 24a axially leads into the bore 4 during assembly. The guide surface allows correction of axial misalignment of the bearing and the bore. The guide portion prevents the ring fouling on the edge of the bore 20, reducing or even eliminating particle production.

In the embodiments described above, the bore 4 has straight side walls. It is possible for the ends of the bore to be chamfered, although the presence of the guide portion makes such chamfering of little benefit.

The tolerance ring of the invention may be used on a hard disk drive, although there are numerous other applications of the present invention, for example any apparatus that uses a tolerance ring. In the example, the hard disk drive has an actuator arm pivotable around a bearing or bearing assembly. Typically, the actuator arm has an electronic transducer at one end for reading and writing data stored on a media disk. The arm pivots around a stationary shaft, which is mounted perpendicular to the plane of rotation of the media disk and arm.

Conventionally, the pivot mechanism comprises a centre shaft and one or a plurality of rolling element bearings surrounding the shaft. Each rolling element bearing includes an inner race attached to the shaft, an outer race located concentrically around the inner race, and a plurality of rolling elements located in the annular space between the inner and outer races. Such an assembly is commonly known as a bearing cartridge assembly. An outer cylinder or sleeve may surround the outer race or races of the bearing or bearings. Although such a hard disk drive is a typical arrangement, it will be appreciated by those in the art that there are other possible arrangements to which the invention can be applied.

What is claimed is:

1. A method of using a tolerance ring comprising:
   providing a tolerance ring of a resilient material comprising a first axial end and a second axial end, a body having a hollow cylindrical shape, a plurality of corrugated protrusions extending radially inward from the body towards a central longitudinal axis of the hollow cylindrical shape such that there are no protrusions that extend radially outward from the body, and a tapered guide portion extending axially from at least one segment of an outer circumference of the body having a guide surface coincident and contiguous with the body at a maximum guide diameter and extending to a minimum guide diameter at a free end of the guide portion forming the first axial end of the tolerance ring, wherein at least a portion of the body having no radial protrusions is disposed axially between the guide portion and the plurality of protrusions;

inserting a shaft into the body of the tolerance ring so as to create an interference fit between the tolerance ring and the shaft by compressing the radially extended protrusions, and inserting the tolerance ring and the shaft axially into a bore of a housing, wherein the first axial end is inserted first into the bore of the housing such that the outer circumference surface of the body engages an interior surface of the bore, whereby creating a radial spring force between the shaft and the interior surface of the bore.

2. The method of claim 1, wherein inserting the tolerance ring into the bore is performed such that no part of the tolerance ring protrudes out of the housing.

3. The method of claim 1, wherein the guide extends from the entire outer circumference of the body.

4. The method of claim 1, wherein the plurality of protrusions includes all protrusions extending from the body, and wherein all protrusions of the plurality of protrusions lie along a same circumferential row.

5. The method of claim 1, wherein an angle of inclination of the guide surface relative to the central longitudinal axis of the body is constant along a length of the guide surface.

6. The method of claim 1, wherein the bore of the housing comprises a mouth having a chamfer.

7. The method of claim 1, wherein, viewed in cross section, the bore has a straight sidewall.

8. The method of claim 1, wherein the plurality of protrusions form waves that run perpendicular to an axis of the tolerance ring.

* * * * *

UNITED STATES PATENT AND TRADEMARK OFFICE
CERTIFICATE OF CORRECTION

PATENT NO. : 10,203,004 B2
APPLICATION NO. : 14/636550
DATED : February 12, 2019
INVENTOR(S) : Niki S. Woodhead et al.

It is certified that error appears in the above-identified patent and that said Letters Patent is hereby corrected as shown below:

Page 3, Line 7, under "FOREIGN PATENT DOCUMENTS", please delete "DE 50166 A1" and insert therefor --DD 50166 A1--.

Signed and Sealed this
Ninth Day of July, 2019

Andrei Iancu
*Director of the United States Patent and Trademark Office*